(12) United States Patent
Muthukkaruppan

(10) Patent No.: US 6,996,694 B1
(45) Date of Patent: Feb. 7, 2006

(54) BASING COMPUTER MEMORY ALLOCATION FOR AGGREGATE DATA TYPES ON DATA SEPARATE FROM A TYPE DEFINITION

(75) Inventor: Kannan Muthukkaruppan, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 382 days.

(21) Appl. No.: 10/247,889

(22) Filed: Sep. 19, 2002

Related U.S. Application Data

(60) Provisional application No. 60/335,653, filed on Oct. 24, 2001, provisional application No. 60/385,543, filed on Jun. 3, 2002.

(51) Int. Cl.
*G06F 12/00* (2006.01)
(52) U.S. Cl. .................. 711/170; 711/171; 345/543
(58) Field of Classification Search ................ 711/154, 711/170–173; 707/103; 709/220–222; 718/104; 345/543
See application file for complete search history.

(56) References Cited

U.S. PATENT DOCUMENTS

| | | | | |
|---|---|---|---|---|
| 5,802,523 A | * | 9/1998 | Jasuja et al. ............. 707/103 R |
| 5,845,296 A | * | 12/1998 | Jasuja et al. ................ 707/205 |
| 5,987,580 A | * | 11/1999 | Jasuja et al. ................ 711/170 |
| 6,182,202 B1 | * | 1/2001 | Muthukkaruppan ......... 711/212 |
| 6,219,666 B1 | * | 4/2001 | Krishnaswamy et al. ...... 707/8 |
| 6,275,830 B1 | * | 8/2001 | Muthukkaruppan et al. ........................ 707/200 |
| 6,591,266 B1 | * | 7/2003 | Li et al. ....................... 707/10 |
| 6,718,434 B2 | * | 4/2004 | Veitch et al. ............... 711/114 |
| 6,751,789 B1 | * | 6/2004 | Berry et al. ................ 717/130 |

OTHER PUBLICATIONS

Dynamic load sharing with unknown memory demands in clusters□□Songqing Chen; Li Xiao; Xiaodong Zhang; Distributed Computing Systems, 2001, 21st International Conference on. , Apr. 16-19, 2001; pp.: 109-118.*

(Continued)

*Primary Examiner*—Nasser Moazzami
(74) *Attorney, Agent, or Firm*—Hickman Palermo Truong & Becker, LLP

(57) ABSTRACT

A method and apparatus for allocating computer memory for an aggregate data type is provided, wherein that allocating is based on data that is separate from a type definition. According to one technique, an instruction to construct an instance of an aggregate data type is received. The aggregate data type (and therefore the instance) includes an attribute. It is determined, based on data called a "Constructor Descriptor", whether memory for that attribute is to be allocated in-line or out-of-line. The Constructor Descriptor is separate from the type definition of the attribute. Memory for the attribute is allocated in-line or out-of-line depending on the determination made. Using this technique, memory allocation can be customized based on, for example, the system resources of a specific computer system. This technique is applicable, for example, to compilers and interpreters of object oriented or record oriented languages. In certain embodiments, the Constructor Descriptor may be used to incrementally construct or incrementally destroy instances of data types.

44 Claims, 11 Drawing Sheets

OTHER PUBLICATIONS

Measuring dynamic memory invocations in object-oriented programs□□Chang, M.; Woo Hyong Lee; Hasan, Y.; Performance, Computing and Communications Conference, 1999. IPCCC '99. IEEE International, Feb. 10-12, 1999; pp.:268-274.*

Hardware support for concurrent garbage collection in SMP systems Chang, J.M.; Srisa-An, W.; Chia-Tien Dan Lo; High Performance Computing in the Asia-Pacific Region, 2000. Proceedings. The Fourth International Conference/Exhibition on, vol.: 1, 14-17 M.*

An Introduction to PL/SQL John C. Lennon; ©2000 Dulcain Inc. http://www.dulcian.com/papers/Introduction%20to%20PLSQL.htm.*

* cited by examiner

| |
|---|
| 902 MAGIC NUMBER AND VERSION NUMBER |
| 904 INSTANCE PRIMARY MEMORY SIZE (IPMS) |
| 906 NUMBER OF ATTRIBUTES (NA + NB) |
| 908 NUMBER OF SECTIONS (2) |
| 910 SIZE OF CONSTRUCTOR DESCRIPTOR |
| 912 SECTION "A" DESCRIPTOR OFFSET (SDO[A]) |
| 914 SECTION "A" PRIMARY MEMORY OFFSET (SPMO[A]) |
| 916 SECTION "B" DESCRIPTOR OFFSET (SDO[B]) |
| 918 SECTION "B" PRIMARY MEMORY OFFSET (SPMO[B]) |
| 920 NUMBER OF ATTRIBUTES IN SECTION "A" (NA) |
| 922 SECTION "A" PRIMARY MEMORY SIZE (SPMS[A]) |
| 924 "A.F[1]" ATTRIBUTE INFORMATION |
| . . . |
| 926 "A.F[NA]" ATTRIBUTE INFORMATION |
| 928 NUMBER OF ATTRIBUTES IN SECTION "B" (NB) |
| 930 SECTION "B" PRIMARY MEMORY SIZE (SPMS[B]) |
| 932 "B.F[1]" ATTRIBUTE INFORMATION |
| . . . |
| 934 "B.F[NB]" ATTRIBUTE INFORMATION |

BASING COMPUTER MEMORY ALLOCATION FOR AGGREGATE DATA TYPES ON DATA SEPARATE FROM A TYPE DEFINITION

CLAIM OF PRIORITY

This application claims benefit of Provisional Application Ser. No. 60/335,653, filed Oct. 24, 2001, entitled "CONSTRUCTION DESCRIPTOR SEGMENT FOR CONSTRUCTING OBJECTS/RECORD INSTANCES," by Kannan Muthukkaruppan, the entire contents of which are incorporated by reference as if fully set forth herein. This application also claims benefit of Provisional Application Ser. No. 60/385,543, filed Jun. 3, 2002, entitled "CONSTRUCTOR DESCRIPTOR SEGMENT FOR CONSTRUCTING OBJECT/RECORD INSTANCES," also by Kannan Muthukkaruppan, the entire contents of which are also incorporated by reference as if fully set forth herein.

FIELD OF THE INVENTION

The present invention relates to computer memory management, and in particular, to basing computer memory allocation for aggregate data types on data that is separate from a type definition.

BACKGROUND OF THE INVENTION

In typical software programs, data is stored in data structures. Typically, each data structure used to store data is an instance of a particular data type. Many data types can be quite complex. For example, a data type may include numerous subcomponents, where each subcomponent is of a complex data type.

The terminology used to refer to data types, and the subcomponents of data types, varies based on the programming environment involved. For example, in some programming environments, data types correspond to object "classes", and the subcomponents of data types correspond to "attributes". In other environments, data types correspond to "records" and the subcomponents correspond to "fields". In other environments, data types correspond to arrays, and the subcomponents correspond to elements of the arrays. For the purpose of explanation, the terms "data type" and/or "class" shall be used to refer to a defined structure for storing data, and the term "attribute" shall be used to refer to a subcomponent of that structure.

An aggregate data type is a data type composed of multiple elements. An aggregate data type may be homogeneous, in that all elements of the aggregate data type may be of the same data type (e.g., an array, a list in a functional language, a string of characters). An aggregate data type may be heterogeneous, in that elements of the aggregate data type may be of different data types (e.g., a structure). In some programming environments, aggregate data types may contain elements that are also aggregate data types (e.g., a list of lists).

The management of memory during the execution of a computer program can have a significant effect on the performance of the computer program. One memory management issue relates to how to allocate memory for instances of aggregate data types. Specifically, storing the attributes of an instance in many relatively small memory segments may hinder performance in systems where memory is abundant. On the other hand, storing the attributes of an instance in few relatively larger memory segments may waste memory, and may also hinder performance in a system where memory is a scarce resource.

Another memory management issue relates to how memory is managed during assignment operations. Some programming environments (e.g., PL/SQL) allow an instance of a subclass to be assigned to a variable that references an instance of a superclass of that subclass. Such an assignment may be referred to as a "widening assignment," because the total memory required by the instance of the subclass will be greater than the total memory required by the instance of the superclass. When memory is allocated for the instance of the subclass, some approach is taken for determining a location at which that memory will be allocated.

Using a total reallocation approach, a memory manager frees all of the memory allocated to the instance of the superclass and allocates for the instance of the subclass a potentially different segment of memory without regard to the location of the memory that was allocated to the superclass. The rationale for such total reallocation is that additional memory contiguous with memory allocated to the instance of the superclass may not be available for allocation to the not-inherited attributes of the instance of the subclass.

Using the total reallocation approach can cause the address of an attribute of the instance referenced by the variable to change, even when that attribute is common to both the superclass and the subclass. In circumstances when the address of the attribute was cached prior to the change, such a change causes the cached address to become invalid, reducing the efficiency obtained from caching.

BRIEF DESCRIPTION OF THE DRAWINGS

The present invention is illustrated by way of example, and not by way of limitation, in the figures of the accompanying drawings and in which like reference numerals refer to similar elements and in which:

FIG. 9 is a block diagram that illustrates a Constructor Descriptor according to an embodiment of the present invention;

DETAILED DESCRIPTION OF THE INVENTION

Figure 1:
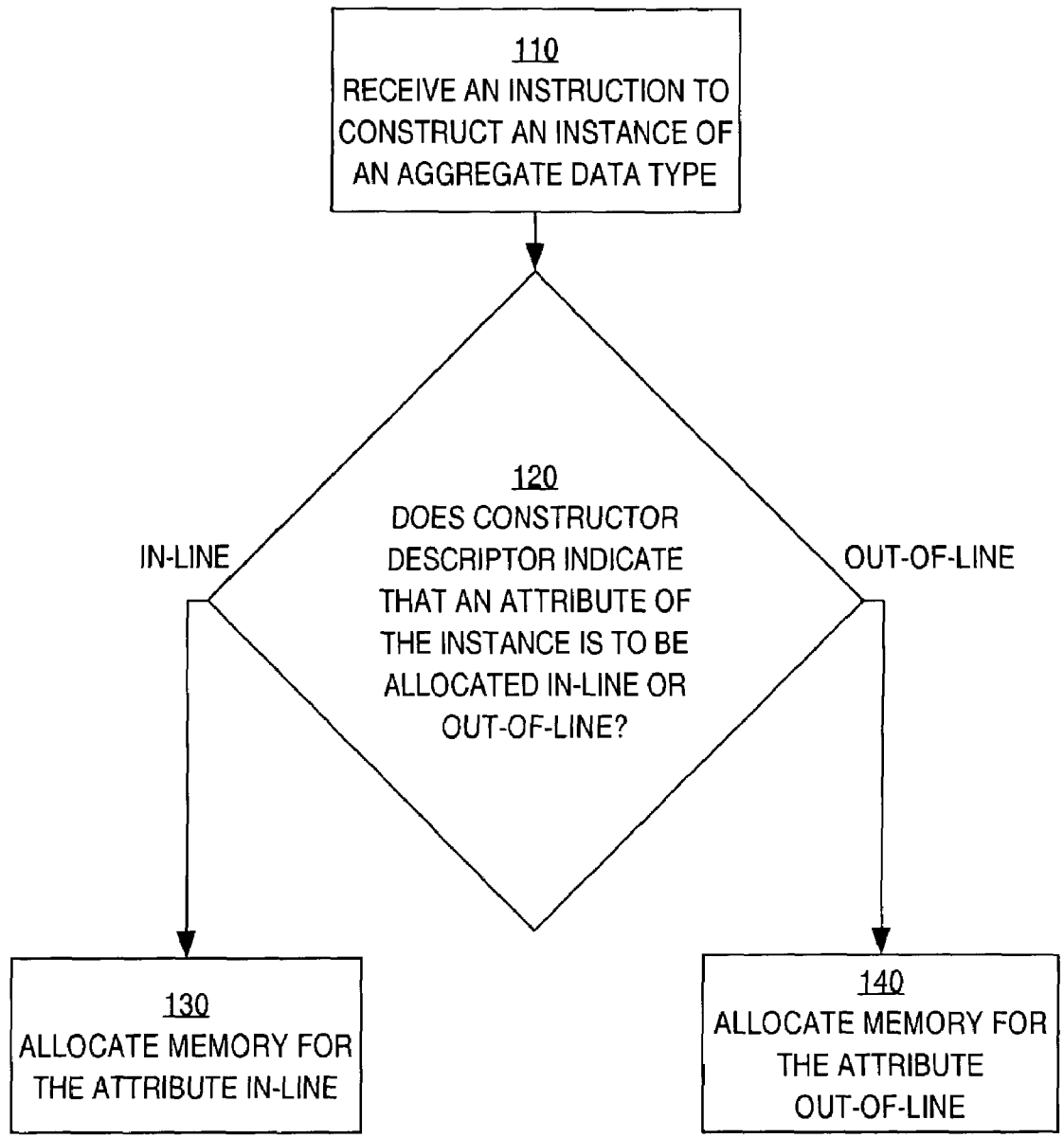
FIG. 1 is a flow diagram that illustrates a technique, according to an embodiment of the present invention, for allocating computer memory, wherein allocation is based on data that is separate from a type definition.

A method and apparatus for allocating computer memory is described, wherein the allocation is based on data that is separate from a type definition. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In-Line and Out-of-Line Attributes

An attribute of an instance of a data type may be allocated either in-line or out-of-line relative to the attribute group to which the attribute belongs. When an attribute of an instance is allocated in-line, it means that the value for the attribute is stored in the "primary segment" of the attribute group to which the attribute belongs. The primary segment of an attribute group is a contiguous segment of memory allocated for holding the values of attributes of that attribute group.

When an attribute of an instance is allocated out-of-line, it means that the value for the attribute is not stored in the primary segment of the attribute group to which the attribute belongs. Instead, the value of the out-of-line attribute is typically stored in a memory segment that is indicated by a pointer that is stored in the primary segment of the attribute group to which the attribute belongs. The memory that is indicated by the pointer is included in the total amount of memory allocated to the instance, but is not necessarily contiguous relative to the primary segment of the attribute group to which the attribute belongs.

Static Type-Based Approach for Memory Allocation

Some programming environments (e.g., PL/SQL and Java) do not provide a programmer with the ability to expressly control memory layout of subcomponents of aggregate data types. Instead, these programming environments include routines that manage memory allocation and reclamation and insulate the programmer from the internal behavior of those routines. In these programming environments in which in-line or out-of-line allocation is possible, some rule must be established to determine whether a particular attribute is allocated in-line or out-of-line.

Using a static type-based approach, whether an attribute will be allocated in-line or out-of-line is determined exclusively by the data type of the attribute. That is, all attributes declared as certain data types are always allocated in-line, while all attributes declared as other data types are always allocated out-of-line. For example, using a type-based approach, all attributes characterized as being of a pointer type (e.g., "int*") may be allocated out-of-line, while all attributes characterized as not being of a pointer type (e.g., "int") may be allocated in-line. For another example of the static type-based approach, in certain versions of PL/SQL, all attributes characterized as being of a numeric type are allocated in-line, while all attributes characterized as being of a string type are allocated out-of-line. Under the constraints of the static type-based approach, the human responsible for writing a computer program is prevented from determining which data types will be allocated in-line and which data types will be allocated out-of-line.

Unfortunately, using the static type-based approach sometimes causes attributes to be allocated in-line or out-of-line in a significantly sub-optimal manner. In computer systems having abundant memory resources but scarce processing resources, allocating attributes out-of-line solely because of their data type can unnecessarily cause performance to suffer as a result of a greater number of allocate operations being performed. Conversely, in computer systems having scarce memory resources, allocating memory attributes in-line solely because of data type can unnecessarily waste memory resources as a result of excessive memory being allocated to an attribute whose data does not currently, but could potentially, occupy the entire segment allocated. Further, allocating memory attributes in-line solely because of data type can unnecessarily cause performance to suffer as a result of a longer time taken to locate a sufficiently sized, available, contiguous segment of memory.

Inherited Attributes

Some programming environments allow a data type to inherit attributes of another data type, so that the attributes are had in common by both data types. A data type that inherits an attribute may be referred to as a subclass. A data type from which an attribute is inherited may be referred to as a superclass. A subclass can inherit attributes from multiple superclasses. A subclass may also introduce additional attributes that are not inherited from any superclass. A subclass may include one or more "attribute groups." Each attribute group typically includes the attributes that the subclass inherits from a particular superclass.

Functional Overview

Techniques are provided for allocating computer memory for aggregate data types. According to one technique, an instruction to construct an instance of an aggregate data type is received. The aggregate data type (and therefore the instance) includes an attribute. It is determined, based on data called a "Constructor Descriptor", whether memory for that attribute is to be allocated in-line or out-of-line. The Constructor Descriptor is separate from a type definition of the attribute. Memory for the attribute is allocated in-line or out-of-line depending on the determination made. Using this technique, memory allocation can be customized based on, for example, the system resources of a specific computer system.

According to one technique provided herein, storage for an aggregate data type is allocated based, in part, on a source of inherited attributes. For example, in programming environments that allow classes to inherit attributes from other classes, an instance of a complex subclass may require memory to be allocated to store attributes that are inherited from many superclasses. According to one technique provided herein, to allocate storage for such complex subclasses, a memory manager may allocate a separate memory segment for each attribute group of the complex subclass.

For example, assume that a subclass X inherits attributes A, B, and C from a superclass Y, inherits attributes D, E and F from a superclass Z, and defines new attributes G, E and H. Under these circumstances, a memory manager, according to one technique provided herein, may allocate memory for an instance of subclass X by allocating a first memory segment for storing the attribute group that includes attributes A, B, and C, a second memory segment for storing the attribute group that includes attributes D, E, and F, and a third memory segment for storing the attribute group that includes attributes G, E and H.

According to one technique provided herein, an instruction to assign an instance of an aggregate data type "B" to a variable is received. If "B" has an attribute "X" in common with an aggregate data type "A" (e.g., due to inheritance), and if an instance of "A" is currently referenced by the variable, then data for "X" of the instance of "B" is stored in a segment of memory allocated to the instance of "A". If "B" includes an attribute "Y" that is not had in common with "A", then data for "Y" of the instance of "B" is stored in an independently allocated segment of memory. This technique may be referred to as "incremental construction." Using the incremental construction technique, cached addresses of commonly-possessed attributes remain valid even after assignments.

According to one technique provided herein, an instruction to construct an instance of an aggregate data type "B" is received. If a search locates a segment of memory that was most recently, but is not currently, allocated to an instance of an aggregate data type "A" that has an attribute "X" in common with "B", then data for "X" of the instance of "B" is stored in that segment. If "B" includes an attribute "Y" that is not had in common with "A", then data for "Y" of the instance of "B" is stored in an independently allocated segment of memory. This technique may also be referred to as incremental construction. Using the incremental construction technique, instances that include common attributes can potentially be constructed more quickly.

According to one technique provided herein, an instruction to assign an instance of an aggregate data type "B" to a variable is received. If "B" has an attribute "X" in common with another aggregate data type "A" (e.g., due to inheritance), and if an instance of "A" is currently referenced by the variable, then data for "X" of the instance of "B" is stored in a segment of memory allocated to the instance of "A". If "A" includes an attribute "Y" that is not had in common with "B", then a segment of memory allocated to "Y" of the instance of "A" is freed. This technique may be referred to as "incremental destruction." Using the incremental destruction technique, formerly used memory becomes available at a potentially earlier time.

The above techniques are applicable, for example, to compilers and interpreters of object oriented or record oriented languages and programming environments.

Constructor Descriptors

Various techniques are described herein for allocating computer memory based on data that is separate from a type definition. According to various embodiments, a "Constructor Descriptor" that applies to an instance is used to indicate (1) which attributes of that instance are to be allocated in-line, and (2) which attributes of that instance are to be allocated out-of-line. The Constructor Descriptor includes data that is separate from a type definition of the attributes of the instance associated with the Constructor Descriptor.

In general, a Constructor Descriptor is data, in any form or structure, created and maintained in any manner, that indicates whether one or more attributes should be allocated in-line or out-of-line. In certain embodiments, a Constructor Descriptor may include a significant amount of additional information about the instance(s) to which it corresponds. In one embodiment, the Constructor Descriptor can have numerous "sections", each of which may correspond to an attribute group possessed by the instance to which the Constructor Descriptor corresponds.

The scope of a Constructor Descriptor may vary from implementation to implementation. For example, in some embodiments, each instance of a particular aggregate data type may have its own Constructor Descriptor. In other embodiments, a Constructor Descriptor may apply to groups of instances. For example, for all instances of an aggregate data type "X" that have global scope, one may use a Constructor Descriptor that indicates that the attribute "X.B" should be allocated in-line. For all instances of an aggregate data type "X" that have local scope, one may use a Constructor Descriptor that indicates that the attribute "X.B" should be allocated out-of-line.

In some embodiments, a Constructor Descriptor may apply to all instances of a particular aggregate data type. For example, a Constructor Descriptor may indicate that, for all instances of an aggregate data type "X", the attribute "X.B" should be allocated in-line.

In yet other embodiments, a Constructor Descriptor may apply to all instances of all aggregate data types that have an attribute of a particular data type. For example, a Constructor Descriptor may indicate that, for all instances of all aggregate data types that have an attribute of data type "B", the attribute of data type "B" should be allocated in-line.

Allocating Memory Based on a Constructor Descriptor

FIG. 1 is a flow diagram that illustrates a technique, according to an embodiment of the present invention, for allocating computer memory based on a Constructor Descriptor. As mentioned above, the Constructor Descriptor (an embodiment of which is described further with reference to FIG. 9 below) includes data that is separate from a type definition of the attributes of the instance associated with the Constructor Descriptor.

In block 110, an instruction is received to construct an instance of an aggregate data type that includes a particular attribute. In decision block 120, it is determined, based on the Constructor Descriptor associated with the instance, whether the particular attribute is to allocated in-line or out-of-line. If the attribute is to be allocated in-line, then, in block 130, memory for the attribute is allocated in-line (within the primary segment of the attribute group to which the attribute belongs).

If the attribute is to be allocated out-of-line, then, in block 140, memory for the attribute is allocated out-of-line. Specifically, memory for the attribute is allocated outside the primary segment for the attribute group, and data used to locate the memory for the attribute (e.g. a pointer) is stored in the primary segment for the attribute group to which the attribute belongs.

Significantly, it is the contents of the Constructor Descriptor associated with the instance, rather than the type definition of the attribute, that determines whether the attribute is allocated in-line or out-of-line. Consequently, using this technique, memory allocation can be customized based on factors other than the type definition of the attribute such as, for example, the system resources of a specific computer system.

Figure 2:
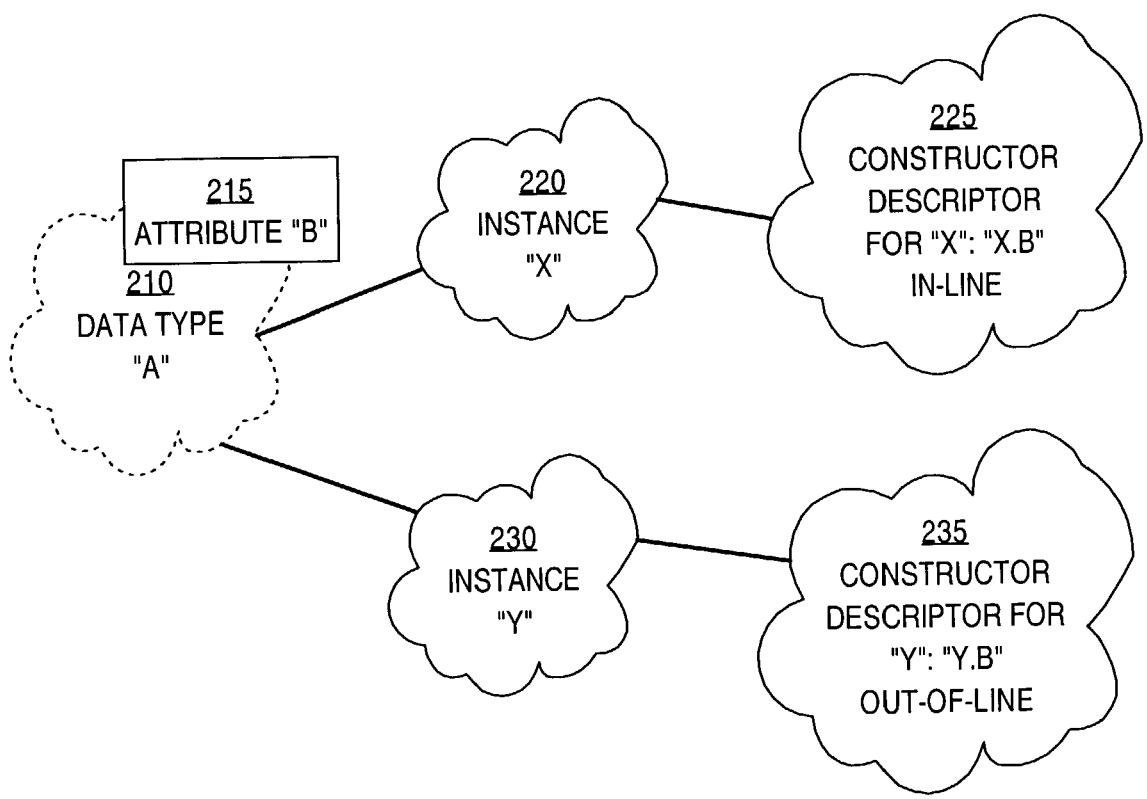
FIG. 2 is a block diagram that illustrates relationships, according to an embodiment of the present invention, between an aggregate data type, instances of that aggregate data type, and Constructor Descriptors for those instances.

FIG. 2 is a block diagram that illustrates relationships, according to an embodiment of the present invention, between an aggregate data type, instances of that aggregate data type, and Constructor Descriptors for those instances. Aggregate data type "A" 210 includes attribute "B" 215. Instance "X" 220 and instance "Y" 230 are both instances of aggregate data type "A" 210. Consequently, attribute "X.B" and attribute "Y.B" are attribute instances of attribute "B". Constructor Descriptor 225 is associated with instance "X" 220. Constructor Descriptor 225 indicates that attribute "X.B" is to be allocated in-line. Constructor Descriptor 235 is associated with instance "Y" 230. Constructor Descriptor 235 indicates that attribute "Y.B" is to be allocated out-of-line. Thus, even though (1) instance "X" 220 and instance "Y" 230 are both instances of aggregate data type "A" 210, and (2) attribute "X.B" and attribute "Y.B" are attribute instances of the same attribute "B" of aggregate data type "A", attribute "X.B" may be allocated differently relative to instance "X" than attribute "Y.B" is allocated relative to instance "Y" because Constructor Descriptor 225 is different than Constructor Descriptor 235.

Figure 3:
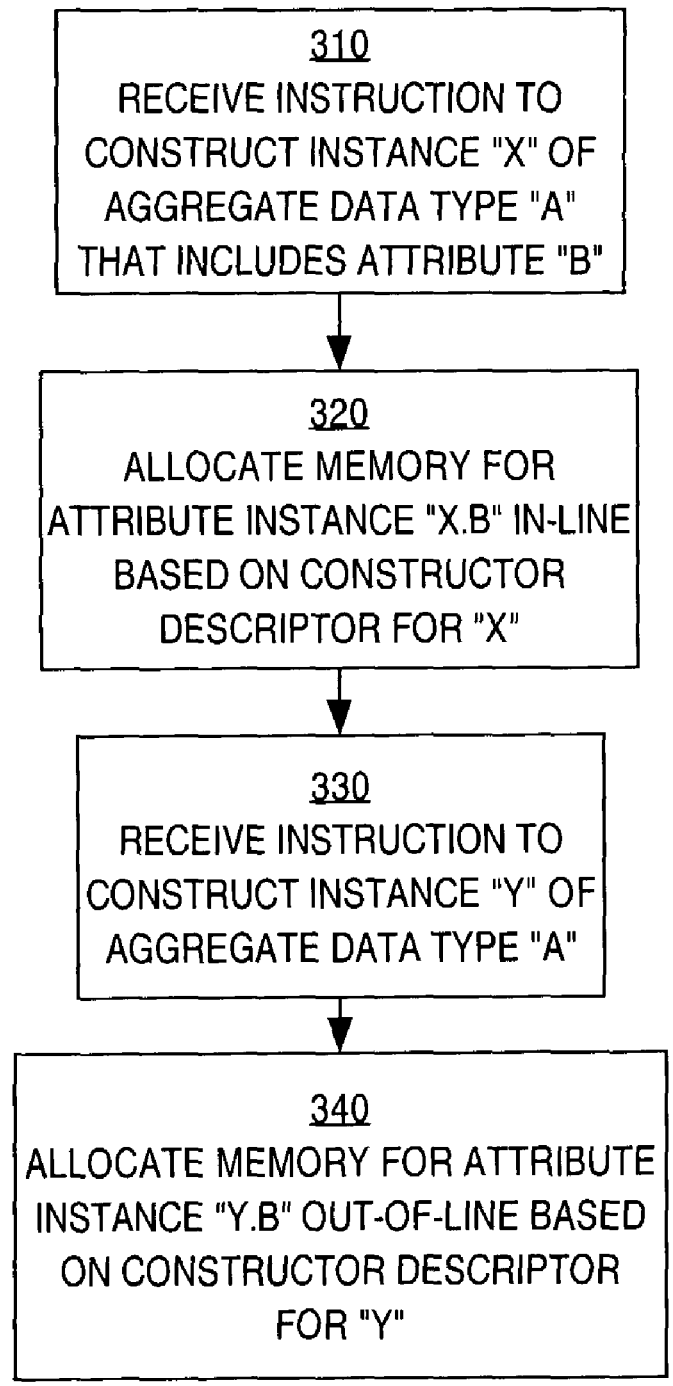
FIG. 3 is a flow diagram that illustrates a technique, according to an embodiment of the present invention, for allocating different instances of an attribute of an aggregate data type in-line and out-of-line relative to different instances, respectively, of that aggregate data type.

FIG. 3 is a flow diagram that illustrates a technique, according to an embodiment of the present invention, for allocating different instances of an attribute of an aggregate data type in-line and out-of-line relative to different instances, respectively, of that aggregate data type. In block 310, an instruction to construct an instance "X" of an aggregate data type "A" that includes an attribute "B" is received. In block 320, memory for an attribute "X.B" is allocated, based on a Constructor Descriptor for the instance "X", in-line. In block 330, an instruction to construct an instance "Y" of the aggregate data type "A" is received. In block 340, memory for an attribute "Y.B" is allocated, based on a Constructor Descriptor for the instance "Y", out-of-line.

Figure 4:
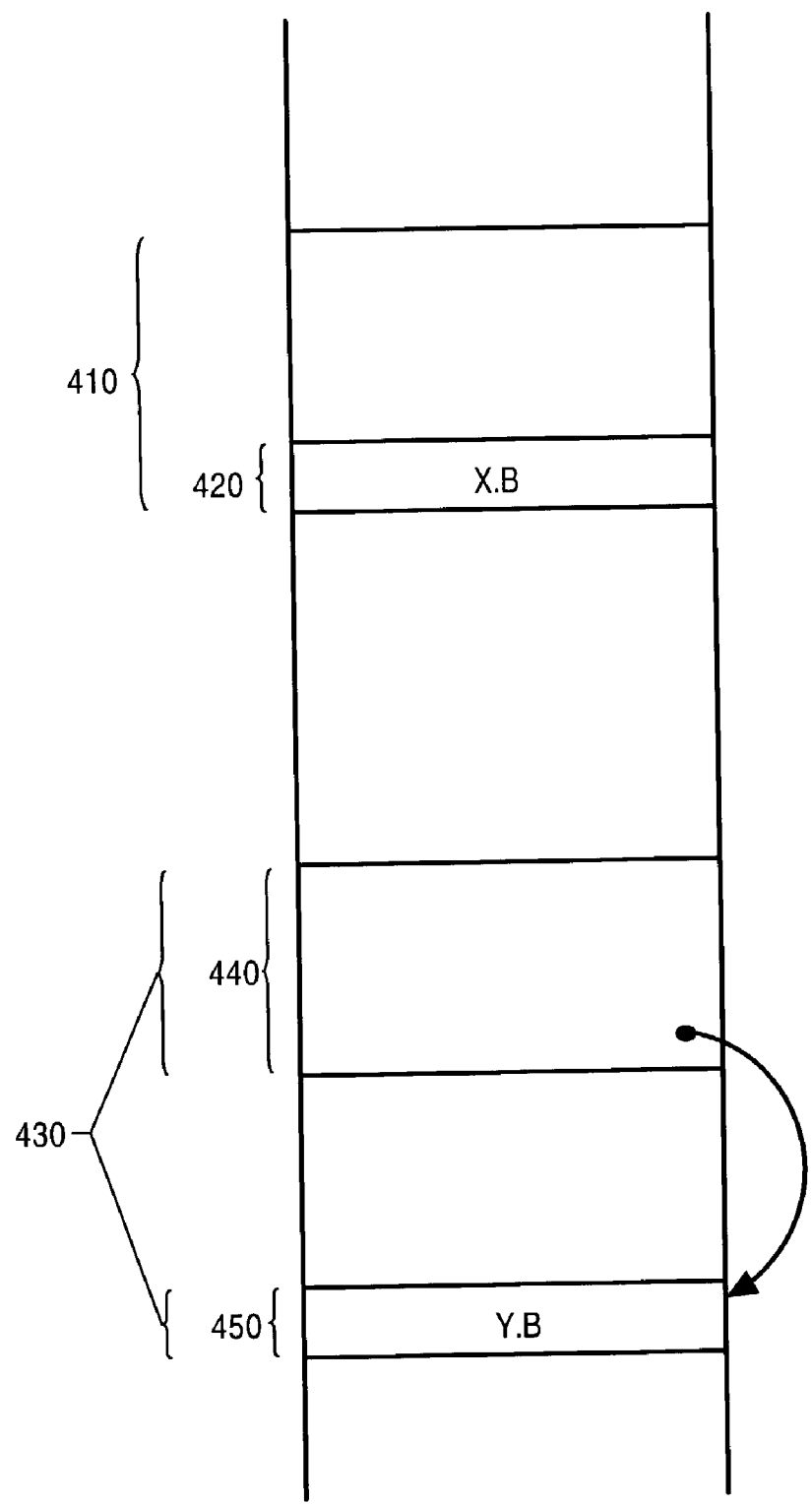
FIG. 4 is a block diagram that illustrates different instances of an attribute of an aggregate data type allocated, according to an embodiment of the present invention, in-line and out-of-line relative to different instances, respectively, of that aggregate data type.

FIG. 4 is a block diagram that illustrates how different instances of the same aggregate data type can differ in how memory is allocated for the same attribute. Specifically, primary segment 410 is allocated to an attribute group of an instance "X" of an aggregate data type "A". The attribute group associated with primary segment 410 includes the attribute "B". The value associated with the attribute "X.B" of the instance "X" is stored in a portion 420 of memory segment 410. Thus, the attribute "X.B" is allocated in-line.

In contrast, memory 430, which is allocated to an attribute group of instance "Y" of the aggregate data type "A", includes primary segment 440 and a separate memory segment 450. Primary segment 440 is a contiguous segment allocated for the attribute group that includes attribute "Y.B". The separate memory segment 450 the value of the attribute "Y.B". Memory segment 450 is not included in primary segment 440. Primary segment 440 includes a pointer that indicates the location of memory segment 450. Thus, the attribute "Y.B" is allocated out-of-line.

Incremental Construction and Destruction

Figure 5:
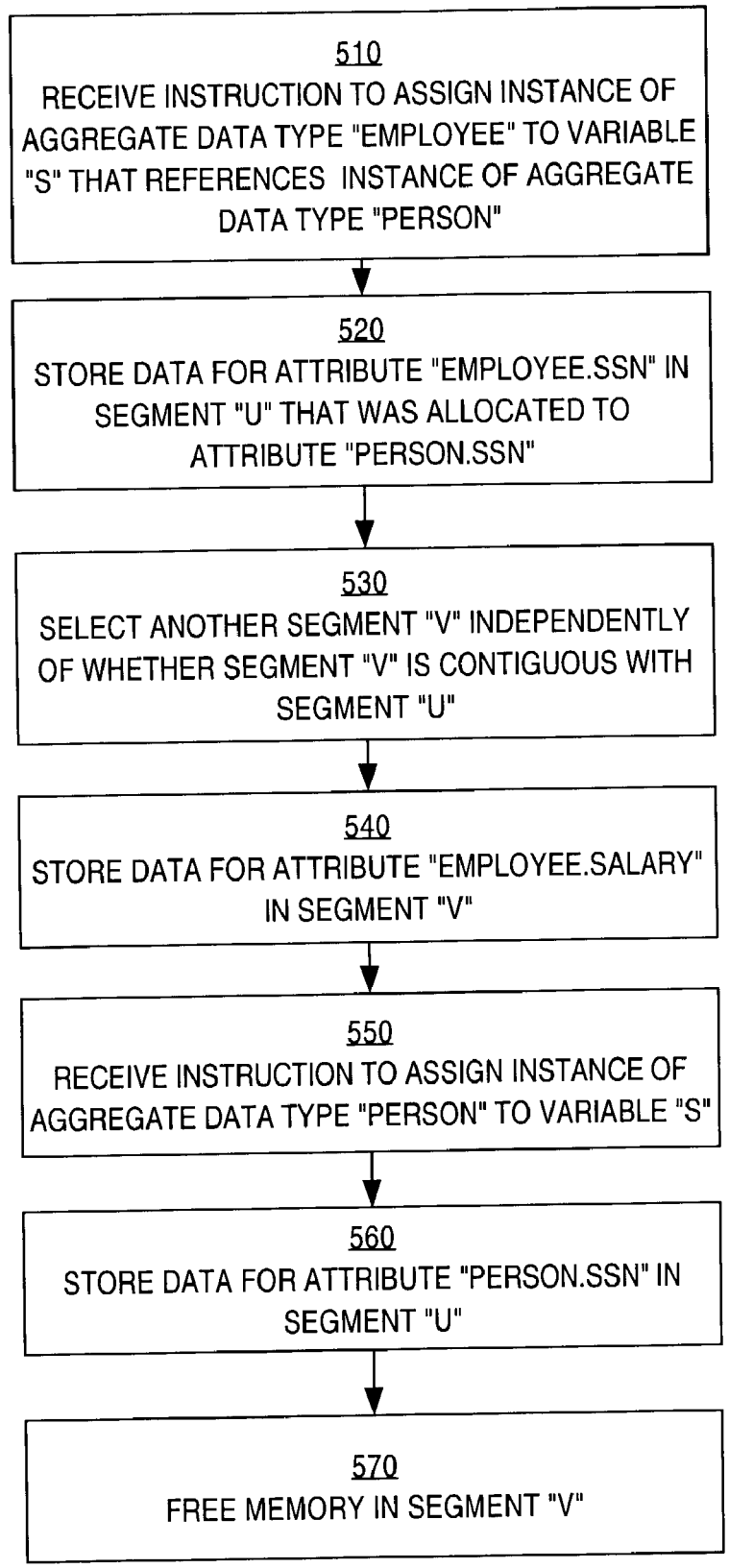
FIG. 5 is a flow diagram that illustrates techniques, according to embodiments of the present invention, for incrementally constructing and destroying instances of aggregate data types assigned to a variable.

FIG. 5 is a flow diagram that illustrates techniques, according to embodiments of the present invention, for incrementally constructing and destroying instances of aggregate data types assigned to a variable. In block 510, an instruction is received to assign an instance of an aggregate data type "EMPLOYEE" to a variable "S" that currently references an instance of an aggregate data type "PERSON". The aggregate data type "EMPLOYEE" inherits an attribute "SSN" from the aggregate data type "PERSON", or both the aggregate data type "EMPLOYEE" and the aggregate data type "PERSON" inherit the attribute "SSN" from yet another aggregate data type that is a common (though not necessarily immediate) ancestor of both "EMPLOYEE" and "PERSON". Due to this inheritance, the aggregate data type "EMPLOYEE" and the aggregate data type "PERSON" are referred to herein as being related data types. Aggregate data type "EMPLOYEE" has an attribute "SALARY" (referred to herein as "EMPLOYEE.SALARY") not included in aggregate data type "PERSON".

In block 520, data for an instance of the attribute "EMPLOYEE.SSN" is stored in a memory segment "U" that was allocated to the instance of the attribute "PERSON.SSN".

In block 530, another memory segment "V" is selected independently of whether the segment "V" is contiguous with the segment "U".

In block 540, data for an instance of the attribute "EMPLOYEE.SALARY" is stored in the segment "V". This technique may be referred to as "incremental construction" because the only memory that needs to be newly allocated in such an assignment is memory for instances of those attributes not commonly had by the related aggregate data types; data for attributes commonly had by the related aggregate data types may be stored in memory that has already been allocated prior to the assignment. Using the incremental construction technique, cached addresses of commonly possessed attributes remain valid even after assignments because data for instances of those commonly possessed attributes is stored at a constant location.

Using a Constructor Descriptor, a part of the memory allocated to an instance of an aggregate subclass, that inherits one or more attributes from an aggregate superclass, may be freed for allocation to other data structures upon an assignment of an instance of the aggregate superclass to a variable that references the instance of the aggregate subclass. The freeing of a part of the memory allocated to the instance of the aggregate subclass may be referred to as "incremental destruction." Rather than freeing all of the memory allocated to the instance of the aggregate subclass upon such an assignment, a memory manager may refer to a Constructor Descriptor of the superclass to determine which of those attributes, for which memory has already been allocated, are also included in the superclass, and then free only that part of the memory that was allocated for attributes not included in the superclass (that part of the memory is not required by the instance of the superclass). Incremental destruction is illustrated below.

In block 550, an instruction to assign an instance of the aggregate data type "PERSON" to the variable "S" is received. In block 560, data for an instance of the attribute "PERSON.SSN" is stored in the segment "U". The location of segment "U" may be determined by reference to a Constructor Descriptor for the instance of "EMPLOYEE", as is taught in further detail with reference to FIG. 9 below.

In block 570, the memory in segment "V" is freed. Because the instance of "PERSON" does not include the attribute to which segment "V" was allocated, segment "V" may, at the time of the assignment of the instance of "PERSON" to "S", be made available to other aggregate data structures. This is considerably faster than the total reallocation approach discussed above. Incremental construction and destruction may also be applied in circumstances other than assignments.

Figure 6:
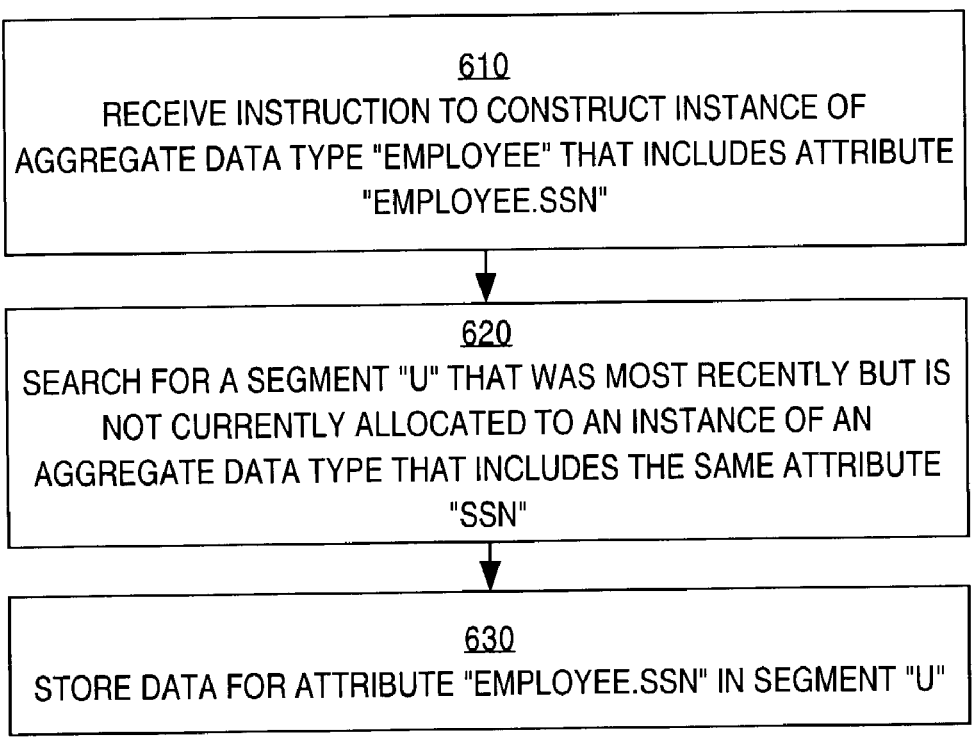
FIG. 6 is a flow diagram that illustrates a technique, according to an embodiment of the present invention, for incrementally constructing an instance of an aggregate data type using memory formerly allocated to an instance of a related aggregate data type.

FIG. 6 is a flow diagram that illustrates a technique, according to an embodiment of the present invention, for incrementally constructing an instance of an aggregate data type using memory formerly allocated to an instance of a related aggregate data type. In block 610, an instruction is received to construct an instance of an aggregate data type "EMPLOYEE" that includes an attribute "SSN" (referred to herein as "EMPLOYEE.SSN"). In block 620, a search is performed for a segment "U" that was most recently, but is not currently, allocated to an instance of an aggregate data type that includes the same attribute "SSN" (for example, an instance of "PERSON" according to the examples above). In block 630, data for the instance of attribute "EMPLOYEE.SSN" is stored in the segment "U".

For example, after an instance of "PERSON" goes out of scope, but before a memory manager reclaims (i.e., "garbage-collects") memory allocated to that instance, the memory manager may store data for the attribute "EMPLOYEE.SSN" of the newly constructed instance of "EMPLOYEE" in memory that was formerly allocated to attribute "PERSON.SSN". This incremental construction increases performance by eliminating the need to re-allocate different memory for the instance of the superclass being assigned or constructed.

Data Representation

Figure 7:
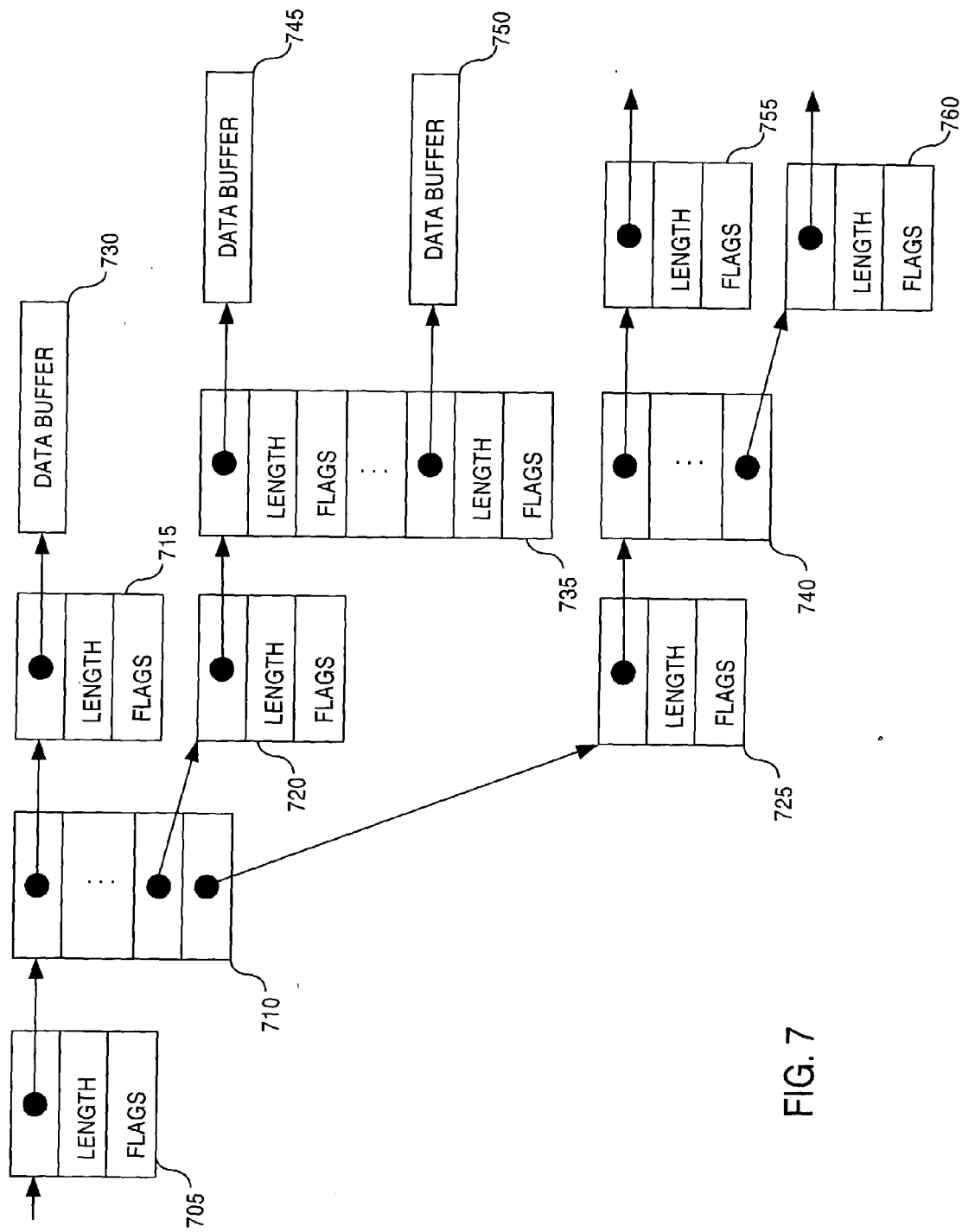
FIG. 7 is a block diagram that illustrates data structures for referencing attributes that are allocated based on a Constructor Descriptor according to an embodiment of the present invention.

FIG. 7 is a block diagram that illustrates data structures for referencing attributes that are allocated based on a Constructor Descriptor according to an embodiment of the present invention. While FIG. 7 shows a logical view of these data structures, an actual instance constructed using a CDS may be physically organized in memory such as is shown, for example, in FIG. 10 below. Based on a Constructor Descriptor for an instance, one or more data structures of a data type PLSMUT may be generated. A data structure of data type PLSMUT (i.e., a PLSMUT structure) is a data structure that references mutable data for an instance of a data type. The PLSMUT data type includes a pointer variable, a variable for an optional length of data in a data buffer referenced by the pointer, and a variable for flags. For example, the PLSMUT data type could be declared in source code by:

```
struct PLSMUT {
    void*          plsbfp;     /* pointer to data buffer */
    unsigned int   plscvl;     /* length of data in buffer [optional] */
    unsigned int   plsmflg;    /* flags */
    #define PLSFNULL       0x0001 /* NULL/NOT_NULL indicator */
    #define PLSFPA         0x0002 /* preallocated (no resize req) */
};
```

According to the example above, an instance of "plsbfp" is a pointer to reference data for an instance. If a PLSMUT structure references an instance of a scalar data type, then the instance of plsbfp may reference a contiguous segment of memory that contains the actual value of the instance. Alternatively, if a PLSMUT structure references an instance of a more complex data type, such as an object or record, then the instance of plsbfp may reference (as is taught in further detail below) an array of PLSMUT structures or an array of pointers to PLSMUT structures.

According to the example above, an instance of "plscvl" is to reference a length of a data buffer for an instance. If a PLSMUT structure references an instance of a scalar data type, then the value of the instance of plscvl may be the size of the memory actually (not potentially) occupied by the value of the instance. Alternatively, if a PLSMUT structure references an instance of a more complex data type, then the instance of plscvl may be unused.

According to the example above, an instance of "plsmflg" is to reference a set of flags (e.g., bits) that indicate various characteristics of an instance. In the above example, two bit flags are defined: "PLSFNULL" and "PLSFPA." If bit PLSFNULL is set, then this indicates that the value of the data buffer for the instance is not known (as representing an unknown value in the data buffer itself may be impossible). If bit PLSFPA is set, then this indicates that a data buffer referenced by the PLSMUT structure is pre-allocated, non-resizable memory. If bit PLSFPA is not set, then this indicates that a data buffer referenced by the PLSMUT structure is heap-allocated, resizable memory. Other flags may also be defined to indicate other characteristics of an instance.

Some programming environments allow a data type to be optionally designated as a "final" data type. A final data type is a data type from which no other data type may inherit attributes. In other words, there cannot be subclasses of a final class. In contrast, other data types may inherit attributes from a data type that is not a final data type.

PLSMUT structure 705 includes a pointer that references an array of pointers 710 because PLSMUT structure 705 was generated from a Constructor Descriptor for an instance of a complex data type (i.e., a data type that is not scalar) that is not a final data type. Consequently, the length field of PLSMUT structure 705 is not used. Array of pointers 710 includes a pointer for each attribute of that complex data type. Arrays of pointers provide an additional level of indirection when accessing values of attributes. A variable that is declared to be of a non-final type uses this additional level in laying out an instance referenced by that variable so that if some other instance is assigned to that variable, then the other instance can be quickly constructed by resizing the array of pointers; the PLSMUT structures for commonly inherited attributes need not be relocated. For example, if an instance of a subclass is being assigned to a variable that formerly referenced an instance of a superclass of that subclass, then the array of pointers could be resized to hold as many pointers as there are total attributes of the subclass. Then, PLSMUT structures and memory segments could be allocated for the attribute group that is newly introduced by the subclass. Then, a PLSMUT structure that formerly pointed to the former array is update to point to the address of the array of pointers after the resize operation. Then, each pointer in the resized array of pointers is made to point to the appropriate PLSMUT structure.

One of the pointers in array of pointers 710 references PLSMUT structure 715. PLSMUT structure 715 includes a pointer that references data buffer 730 because PLSMUT structure 715 was generated, from a Constructor Descriptor, for an attribute instance of a scalar data type. The length field of PLSMUT structure 715 includes the size of the data stored in data buffer 730. The pre-allocated or resizable nature of data buffer 730 is indicated in the flags field of PLSMUT structure 715, by the PLSFPA flag. For example, if data buffer 730 stores a string (which may vary in length), then the PLSFPA flag may indicate that data buffer 730 is resizable and not pre-allocated. Data buffer 730 stores the actual value of an instance corresponding to a Constructor Descriptor for which PLSMUT 715 was generated.

Another of the pointers in array of pointers 710 references PLSMUT structure 720. PLSMUT structure 720 includes a pointer that references array of PLSMUT structures 735 because PLSMUT structure 720 was generated from a Constructor Descriptor for an attribute instance of a final data type. One of the PLSMUT structures in array of PLSMUT structures 735 includes a pointer that references data buffer 745. Another of the PLSMUT structures in array of PLSMUT structures 735 includes a pointer that references data buffer 750. All of the PLSMUT structures in array of PLSMUT structures 735 were generated, from Constructor Descriptors, for scalar data types; thus, PLSMUT structure 720 was generated from a Constructor Descriptor for an instance of a final data type.

Yet another of the pointers in array of pointers 710 references PLSMUT structure 725. PLSMUT structure 725 includes a pointer that references array of pointers 740 because PLSMUT structure 725 was generated, from a Constructor Descriptor, for an attribute instance of a non-final data type (unlike PLSMUT structure 720, which corresponds to a final data type). Therefore, instead of referencing an array of PLSMUT structures like array of PLSMUT structures 735, the pointer included in PLSMUT structure 725 references array of pointers 740.

Array of pointers 740 includes a pointer to PLSMUT structure 755 and a pointer to PLSMUT structure 760. It is clear that PLSMUT structure 755 and PLSMUT 760 may reference additional data structures, not shown. Each attribute of each instance is represented by a unique PLSMUT data structure. The implementation of PLSMUT data structures, such as is illustrated above, ensures that addresses of attributes references by these structures will not change prior to those attributes going out of scope. This, in turn, allows for more efficient caching of attribute addresses and, in some situations, helps to avoid the creation of extra temporary variables.

It should be noted that the structures described herein are merely examples of embodiments with which the techniques described herein may be used. However, use of these techniques is not limited to any particular way of implementing data structures. For example, the techniques described herein may be used in a system that does not employ anything similar to PLSMUT structures.

Example Constructor Descriptor Creation

Figure 8:
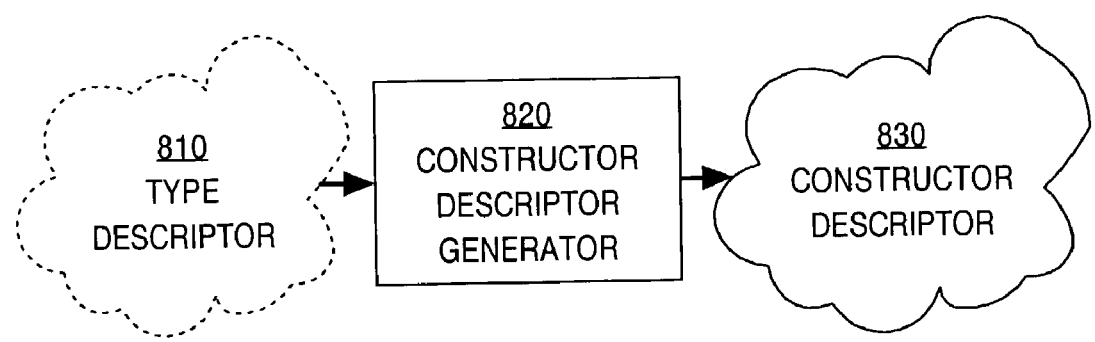
FIG. 8 is a data flow diagram that illustrates the generation of a Constructor Descriptor according to an embodiment of the present invention.

FIG. 8 is a data flow diagram that illustrates the generation of a Constructor Descriptor according to an embodiment of the present invention. Type Descriptor (TD) 810 is received as input by Constructor Descriptor generator 820. TD 810 includes information that indicates any attributes that are included in a data type. TD 810 may include information indicating which attributes a data type has in common with another data type. TD 810 includes information that is independent of a specific computer system.

At least partially based on TD 810, Constructor Descriptor generator 820 generates as output Constructor Descriptor 830. For example, from TD 810, Constructor Descriptor generator 820 may determine the size of a memory segment required for an instance; this size may be used in generating Constructor Descriptor 830. Constructor Descriptor generator 820 may also generate Constructor Descriptor 830 based on criteria additional to and separate from TD 810, discussed in further detail below. Constructor Descriptor 830 includes information that may depend on a specific computer system, such as a computer system for which machine language is being generated.

Constructor Descriptor generator 820 may be included in a compiler or interpreter. Constructor Descriptor generator 820 may generate Constructor Descriptor 830 at a time, for example, that source code including or referencing TD 810 is compiled into machine language (i.e., at compile-time). Alternatively, Constructor Descriptor generator 820 may generate Constructor Descriptor 830 at a time that such machine language is executed by a computer system (i.e., at run-time).

Criteria for Making In-Line/Out-of-Line Decision

Whether an attribute is to be allocated in-line or out-of-line (and, consequently, how Constructor Descriptor 830 will reflect this) may be determined in any of several different ways, some of which are described in detail by examples below. An instance may be characterized by a scope; for example, the scope of an instance may be local to a procedure or process, shared by multiple procedures or processes, or global to all procedures or processes. Attributes of an instance of a given scope may be universally allocated in-line or out-of-line on a scope-type basis. For example, all attributes of local instances may be allocated in-line, while all attributes or global instances are allocated out-of-line. The scope of an instance may determine a duration of that instance and the attributes of that instance. Attributes of an instance associated with a given type of duration may similarly be allocated in-line or out-of-line on a duration-type basis.

For another example, a heuristic may specify whether an attribute is to be allocated in-line or out-of-line based on a size of a segment of memory that is required by the attribute. Different attributes of the same type (e.g., arrays) may be characterized by different sizes; therefore, the heuristic may make the in-line/out-of-line determination independently of the type of an attribute. An example heuristic may specify that attributes characterized by a size exceeding a predetermined threshold are to be allocated out-of-line and that attributes not exceeding that threshold are to be allocated in-line.

For another example, source code may syntactically specify whether an attribute is to be allocated in-line or out-of-line. Example source code may specify in-line or out-of-line memory allocation for a single attribute, for every attribute of an attribute group, for every attribute group of an instance, for every instance of an object or record type, and/or for every object or record type in a program source code. Example source code may also specify that memory for all attributes of a specified data type is to be allocated in-line or out-of-line regardless of the data type that includes those attributes. Such specification, while potentially basing the in-line/out-of-line determination on a declared type of an attribute, may still permit a human user to select, independently of static preferences permanently incorporated into a source code compiler or interpreter, the attribute types for which memory is to be allocated either in-line or out-of-line.

Alternatively, a compiler or interpreter may perform the in-line/out-of-line determination whose results are reflected in a Constructor Descriptor. An example compiler or interpreter may produce machine language code that allocates memory to attributes in-line or out-of-line based on characteristics (e.g., memory and/or processing speed) of a computer system that executes the compiler or interpreter. Such compiled code effectively incorporates the Constructor Descriptor, having code that reflects the in-line or out-of-line decisions made by the compiler or interpreter.

Ways of Selecting Criteria

Regardless of which criteria are chosen to indicate in-line or out-of-line memory allocation through a Constructor Descriptor, such criteria may be chosen in different ways. For example, the criteria may be permanently incorporated into a compiler or interpreter, and may be immutable (or possibly overridden) by a user of the compiler or interpreter. Alternatively, a human user may expressly provide the criteria, in the form of a directive to the compiler or interpreter (e.g., a command-line directive), and/or in the form of a directive provided in the source code for which the machine language code is to be produced.

Example Constructor Descriptor

FIG. 9 is a block diagram that illustrates a Constructor Descriptor according to an embodiment of the present invention. Given, for example, a type hierarchy (reflected in a TDS) where aggregate data type "A" includes attributes "A.F[1]" through "A.F[NA]" (where "NA" is the number of attributes in data type "A"), and where aggregate data type "B" includes all of the attributes of aggregate data type "A" and also attributes "B.F[1]" through "B.F[NB]" (where "NB" is the number of not-inherited attributes in data type "B"), a Constructor Descriptor for an instance of aggregate data type "B" may be produced. Such an example Constructor Descriptor is described further below. In the below example, aggregate data type "B" is a "final" data type.

The Constructor Descriptor for the instance of aggregate data type "B" includes information that can be used to construct the instance of aggregate data type "B". Such information can be used to construct the instance of aggregate data type "B" either incrementally or from scratch.

The Constructor Descriptor for aggregate data type "B" shown in FIG. 9 includes various sections. Specifically, the Constructor Descriptor includes a header that includes summary information about the instance. The Constructor Descriptor also includes a section corresponding to each attribute group of the aggregate data type (e.g., a section for those attributes of aggregate data type "B" which are inherited from "A", and a section for those attributes of aggregate data type "B" which are defined in "B"). Each section is described by a section descriptor. Thus, reference may be made to particular section descriptors within a Constructor Descriptor during incremental construction or destruction. The Constructor Descriptor may be implemented as an array, with each section descriptor including some elements of that array.

The portion of the Constructor Descriptor that includes summary information includes array elements for each of the following: magic number and Constructor Descriptor version number 902 (optional), instance primary segment size (IPMS) 904, number of attributes (NA+NB) 906, number of sections 908 (in this example, two sections), size of Constructor Descriptor 910, section "A" descriptor offset (SDO[A]) 912, section "A" primary segment offset (SPMO [A]) 914, section "B" descriptor offset (SDO[B]) 916, and section "B" primary segment offset (SPMO[B]) 918.

An instance's primary segment (IPM) is a contiguous segment of memory that includes memory allocated for an array of PLSMUT structures (a PLSMUT structure for each attribute of the instance) and memory allocated for values of attributes that are to be stored in-line with the instance. IPMS 904 is the size of the IPM.

The starting address of the section "A" descriptor may be located by adding the value of SDO[A] 940 (stored in the array element for SDO[A] 912) to the base address of the Constructor Descriptor. The starting address of the section "B" descriptor may be located by adding the value of SDO[B] 950 (stored in the array element for SDO[B] 916) to the base address of the Constructor Descriptor.

SPMO[A] 914 stores an offset, from the starting address of the IPM, at which memory is allocated to store values of in-line attributes corresponding to section "A". SPMO[B] 918 stores an offset, from the starting address of the IPM, at which memory is allocated to store values of in-line attributes corresponding to section "B". If a section's primary segment is to be stored out-of-line relative to the instance primary segment, then the value of the corresponding SPMO would be set to "−1".

The section "A" descriptor includes array elements for each of the following: number of attributes in section "A" (NA) 920, section "A" primary segment size (SPMS[A]) 922, and attribute information for "A.F[1]" to "A.F[NA]" 924–926.

The section "B" descriptor includes array elements for each of the following: number of attributes in section "B" (NB) 928, section "B" primary segment size (SPMS[B]) 930, and attribute information for "B.F[1]" to "B.F[NA]" 932–934.

A section's primary segment (SPM) is a contiguous segment of memory that includes memory allocated for values of attributes that correspond to that section if those attributes are to be stored in-line. Each SPM may be allocated in-line with the IPM or out-of-line from the IPM. SPMS[A] 922 is the size of the SPM for section "A". SPMS[B] 930 is the size of the SPM for section "B".

Array entries for attribute information 924–926 and 932–934 each include an attribute data offset (ADO). The ADO is an offset, from the starting address of the SPM of the section in which that attribute is included, at which memory is allocated to store a value of that attribute, if that attribute is to be allocated in-line. If the value of that attribute is to be stored out-of-line, then the value of the corresponding ADO would be set to "−1". If the attribute is itself an instance of a complex data type (i.e., a nested instance), then the array entry for that attribute information includes, following the ADO, a Constructor Descriptor for that nested instance.

Allocating Memory Based on Constructor Descriptor

Figure 10:
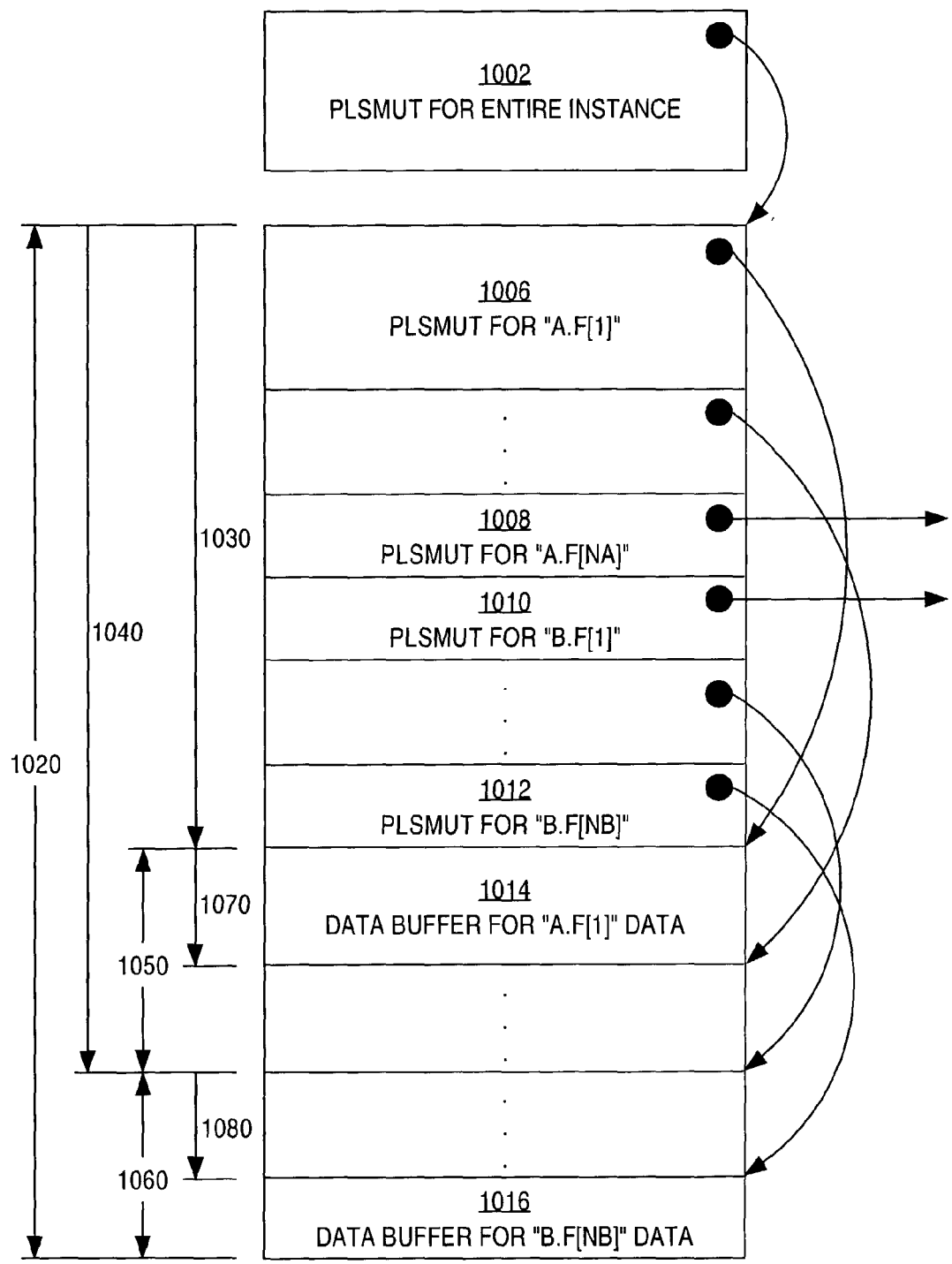
FIG. 10 is a block diagram that illustrates an aggregate data type instance that is stored in memory that is allocated based on a Constructor Descriptor, according to an embodiment of the present invention.

FIG. 10 is a block diagram that illustrates an aggregate data type instance that is stored in memory that is allocated based on a Constructor Descriptor, according to an embodiment of the present invention. Memory allocation may be performed by routines that manage memory allocation and reclamation and insulate a programmer from the internal behavior of those routines. Such routines are adapted to allocate memory based on a Constructor Descriptor for an instance. An example memory allocation for an instance of aggregate data type "B", based on the example Constructor Descriptor described above with reference to FIG. 9, is described below.

PLSMUT structure for the entire instance 1002 references (as illustrated by a pointer) a contiguous segment of memory that includes PLSMUT structures for "A.F[1]" through "A.F[NA]" 1006–1008 (one PLSMUT structure for each attribute of section "A"), PLSMUT structures for "B.F[1]" through "B.F[NB]" 1010–1012, and data buffers for those of attributes "A.F[1]" through "A.F[NA]" and "B.F[1]" through "B.F[NA]" that are allocated in-line 1014–1016. Data buffers for those attributes that are allocated out-of-line are not shown.

The Constructor Descriptor for the instance indicates that attribute "A.F[1]" is to be allocated in-line. Therefore, PLSMUT structure for "A.F[1]" 1006 references an address of data buffer for "A.F[1]" data 1014. The Constructor Descriptor for the instance indicates that attribute "A.F [NA]" is to be allocated out-of-line. Therefore, PLSMUT structure for "A.F[NA]" 1008 references a data buffer outside of the primary segment of section "A". Other attributes included within the range "A.F[1]" through "A.F[NA]" may be allocated either in-line or out-of-line as indicated by the Constructor Descriptor for the instance. For each of these attributes, a PLSMUT structure for that attribute references a data buffer (located either inside or outside of the primary segment of section "A" depending on in-line or out-of-line allocation) for that attribute.

The Constructor Descriptor for the instance indicates that attribute "B.F[1]" is also to be allocated out-of-line. Therefore, PLSMUT structure for "B.F[1]" 1010 references a data buffer outside of the primary segment of section "B". The Constructor Descriptor for the instance indicates that attribute "B.F[1]" is to be allocated in-line. Therefore, PLSMUT structure for "B.F[1]" 1012 references an address of data buffer for "B.F[1]" data 1014. Other attributes included within the range "B.F[1]" through "B.F[NA]" may be allocated either in-line or out-of-line as indicated by the Constructor Descriptor for the instance. For each of these attributes, a PLSMUT structure for that attribute references a data buffer (located either inside or outside of the primary segment of section "B" depending on in-line or out-of-line allocation) for that attribute.

Size 1020 is determined from the value of IPMS 904. Offset 1030 is determined from the value of SPMO[A] 914. Offset 1040 is determined from the value of SPMO[B] 918. Size 1050 is determined from the value of SPMS[A] 922. Size 1060 is determined from the value of SPMS[B] 930. Offset 1070 is determined from the value of the ADO stored in an "A.F[2]" attribute information (not shown). Offset 1080 is determined from the value of the ADO stored in "B.F[NB]" attribute information 934. Other sizes and offsets may be determined from various values stored in the Constructor Descriptor for the instance. Using the Constructor Descriptor for the instance, memory for the instance is allocated in a logically simple and uniform manner.

Hardware Overview

Figure 11:
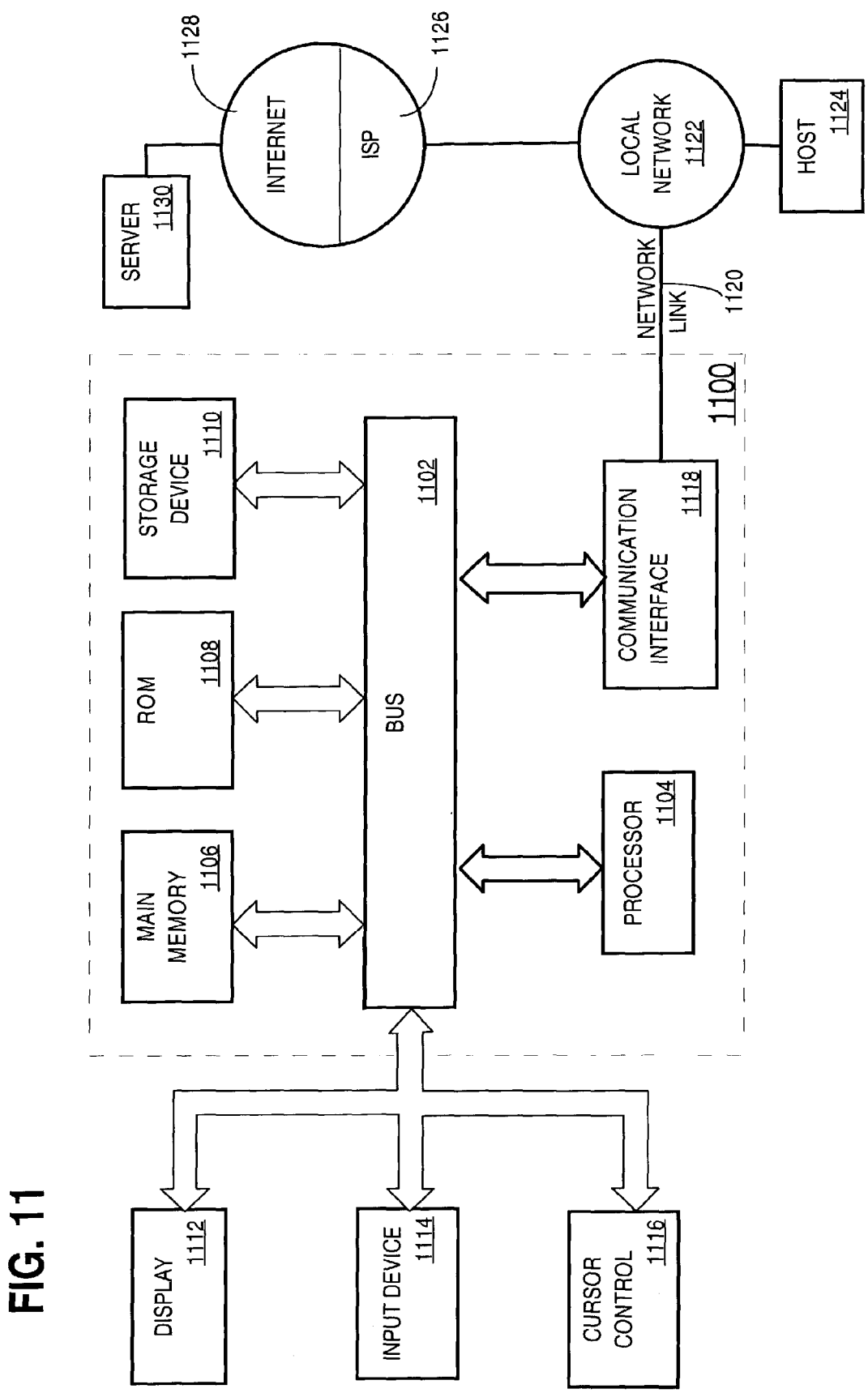
FIG. 11 is a block diagram that illustrates a computer system 1100 upon which an embodiment of the invention may be implemented.

FIG. 11 is a block diagram that illustrates a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution. In this manner, computer system 1100 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of allocating computer memory to an instance of an aggregate data type, the method comprising:
   receiving an instruction to construct the instance of the aggregate data type;
   determining, based on first data separate from a type definition of an attribute of the instance, whether to allocate memory for said attribute within a contiguous segment of memory to be allocated for an attribute group, of said instance, to which said attribute belongs;
   if it is determined that the memory for said attribute is to be allocated within the contiguous segment, then allocating the memory for said attribute within the contiguous segment; and
   if it is determined that the memory for said attribute is not to be allocated within the contiguous segment, then allocating the memory for said attribute in a segment of memory indicated by a pointer stored within the contiguous segment.

2. The method of claim 1, wherein said first data is passed as a parameter to a routine for constructing said instance.

3. The method of claim 2, wherein a value of said parameter is selected, based on the type definition of the attribute, by a user.

4. The method of claim 1, wherein said first data is based on an amount of memory required by said attribute.

5. The method of claim 1, wherein said first data is based on a size of the contiguous segment.

6. The method of claim 1, wherein said first data is based on a scope of said instance.

7. The method of claim 1, wherein said first data is based on a duration of said instance.

8. The method of claim 1, wherein said first data is based on whether a characteristic of said attribute exceeds a predetermined threshold.

9. The method of claim 1, wherein said first data is based on a directive that is included in source code, said source code also including said type definition.

10. The method of claim 1, wherein said first data is based on a characteristic of a computer system.

11. A method of allocating computer memory, the method comprising:
   for a first instance of an aggregate data type, allocating, for an attribute of the aggregate data type, memory within a contiguous segment of memory to be allocated for an attribute group, of the first instance, that includes said attribute, but not allocating memory outside of the contiguous segment for said attribute; and
   for a second instance of said aggregate data type, allocating, for said attribute, memory outside of a contiguous segment of memory to be allocated for the attribute group, of the second instance, that includes said attribute, but not allocating memory for said attribute within the contiguous segment of memory to be allocated for the attribute group of the second instance.

12. The method of claim 11, wherein the allocating for the first instance includes allocating based on a directive that is included in source code that includes said aggregate data type.

13. The method of claim 11, wherein the allocating for the first instance includes allocating based on a scope of said first instance.

14. The method of claim 11, wherein the allocating for the first instance includes allocating based on a duration of said first instance.

15. The method of claim 11, wherein the allocating for the first instance includes allocating based on whether a characteristic of said attribute of said first instance exceeds a predetermined threshold.

16. A method of allocating computer memory to an instance of an aggregate data type, the method comprising:
   receiving an instruction to assign a first instance to a variable that references a second instance;
   wherein the first instance is an instance of a first aggregate data type;
   wherein the second instance is an instance of a second aggregate data type;
   wherein the first aggregate data type includes
      a first attribute in common with said second aggregate data type, and
      a second attribute;

in response to the instruction, performing the steps of
   storing data for said first attribute of the first instance in a first segment of memory that was allocated to the second instance;
   selecting a second segment of memory independently of whether the second segment is contiguous relative to the first segment; and
   storing data for said second attribute of the first instance in said second segment.

17. The method of claim 16, wherein the second attribute is not included in the second aggregate data type.

18. The method of claim 16, further comprising:
   receiving an instruction to assign a third instance to the variable;
   wherein the third instance is an instance of the second aggregate data type;
   in response to said instruction, performing the steps of
      storing data for an attribute of the third instance in said first segment, wherein the attribute of the third instance is included in the first data type; and
      freeing the second segment of memory.

19. A method of allocating computer memory to an instance of a class, the method comprising:
   allocating memory for a variable associated with a first class; and
   after allocating said memory, performing the following steps in response to said variable being associated with a second class, wherein the second class has a first attribute in common with said first class, wherein the second class has a second attribute not in common with said first class:
      storing said first attribute using said memory allocated to said variable, and
      storing said second attribute at a location selected without regard to a location at which said variable is stored.

20. The method of claim 19, wherein said second class is a subclass of said first class.

21. The method of claim 19, further comprising:
   performing the following steps in response to said variable being associated with said first class after said variable having been associated with said second class:
      storing an attribute of said first class using said memory allocated to said variable, wherein said attribute of said first class is had in common by said second class, and
      freeing memory that stores said second attribute.

22. A method of allocating computer memory to an instance of a first aggregate data type, the method comprising:
   receiving an instruction to construct said instance;
   searching for a segment of memory that was most recently, but is not currently, allocated to an instance of a second aggregate data type;
   wherein the first aggregate data type includes a first attribute in common with the second aggregate data type; and
   storing, in said segment, data for said first attribute of said instance of said first aggregate data type.

23. A tangible computer-readable medium carrying one or more sequences of instructions for allocating computer memory to an instance of an aggregate data type, wherein execution of the one or more sequences of instructions by one or more processors causes the one or more processors to perform the steps of:
   receiving an instruction to construct the instance of the aggregate data type;
   determining, based on first data separate from a type definition of an attribute of the instance, whether to allocate memory for said attribute within a contiguous segment of memory to be allocated for an attribute group, of said instance, to which said attribute belongs;
   if it is determined that the memory for said attribute is to be allocated within the contiguous segment, then allocating the memory for said attribute within the contiguous segment; and
   if it is determined that the memory for said attribute is not to be allocated within the contiguous segment, then allocating the memory for said attribute in a segment of memory indicated by a pointer stored within the contiguous segment.

24. The computer-readable medium of claim 23, wherein said first data is passed as a parameter to a routine for constructing said instance.

25. The computer-readable medium of claim 24, wherein a value of said parameter is selected, based on the type definition of the attribute, by a user.

26. The computer-readable medium of claim 23, wherein said first data is based on an amount of memory required by said attribute.

27. The computer-readable medium of claim 23, wherein said first data is based on a size of the contiguous segment.

28. The computer-readable medium of claim 23, wherein said first data is based on a scope of said instance.

29. The computer-readable medium of claim 23, wherein said first data is based on a duration of said instance.

30. The computer-readable medium of claim 23, wherein said first data is based on whether a characteristic of said attribute exceeds a predetermined threshold.

31. The computer-readable medium of claim 23, wherein said first data is based on a directive that is included in source code, said source code also including said type definition.

32. The computer-readable medium of claim 23, wherein said first data is based on a characteristic of a computer system.

33. A tangible computer-readable medium carrying one or more sequences of instructions for allocating computer memory, wherein execution of the one or more sequences of instructions by one or more processors causes the one or more processors to perform the steps of:
   for a first instance of an aggregate data type, allocating, for an attribute of the aggregate data type, memory within a contiguous segment of memory to be allocated for an attribute group, of the first instance, that includes said attribute, but not allocating memory outside of the contiguous segment for said attribute; and
   for a second instance of said aggregate data type, allocating, for said attribute, memory outside of a contiguous segment of memory to be allocated for the attribute group, of the second instance, that includes said attribute, but not allocating memory for said attribute within the contiguous segment of memory to be allocated for the attribute group of the second instance.

34. The computer-readable medium of claim 33, wherein the allocating for the first instance includes allocating based on a directive that is included in source code that includes said aggregate data type.

35. The computer-readable medium of claim 33, wherein the allocating for the first instance includes allocating based on a scope of said first instance.

36. The computer-readable medium of claim 33, wherein the allocating for the first instance includes allocating based on a duration of said first instance.

37. The computer-readable medium of claim 33, wherein the allocating for the first instance includes allocating based on whether a characteristic of said attribute of said first instance exceeds a predetermined threshold.

38. A tangible computer-readable medium carrying one or more sequences of instructions for allocating computer memory to an instance of an aggregate data type, wherein execution of the one or more sequences of instructions by one or more processors causes the one or more processors to perform the steps of:
- receiving an instruction to assign a first instance to a variable that references a second instance;
- wherein the first instance is an instance of a first aggregate data type;
- wherein the second instance is an instance of a second aggregate data type;
- wherein the first aggregate data type includes
  - a first attribute in common with said second aggregate data type, and
  - a second attribute;
- in response to the instruction, storing data for said first attribute of the first instance in a first segment of memory that was allocated to the second instance;
- in response to the instruction, selecting a second segment of memory independently of whether the second segment is contiguous relative to the first segment; and
- in response to the instruction, storing data for said second attribute of the first instance in said second segment.

39. The computer-readable medium of claim 38, wherein the second attribute is not included in the second aggregate data type.

40. The computer-readable medium of claim 38, the steps further comprising:
- receiving an instruction to assign a third instance to the variable;
- wherein the third instance is an instance of the second aggregate data type;
- in response to said instruction, storing data for an attribute of the third instance in said first segment, wherein the attribute of the third instance is included in the first aggregate data type; and
- in response to said instruction, freeing the second segment of memory.

41. A tangible computer-readable medium carrying one or more sequences of instructions for allocating computer memory to an instance of a class, wherein execution of the one or more sequences of instructions by one or more processors causes the one or more processors to perform the steps of:
- allocating memory for a variable associated with a first class;
- after allocating said memory, in response to said variable being associated with a second class, storing said first attribute using said memory allocated to said variable, wherein the second class has a first attribute in common with said first class, wherein the second class has a second attribute not in common with said first class; and
- after allocating said memory, in response to said variable being associated with said second class, storing said second attribute at a location selected without regard to a location at which said variable is stored.

42. The computer-readable medium of claim 41, wherein said second class is a subclass of said first class.

43. The computer-readable medium of claim 41, the steps further comprising:
- in response to said variable being associated with said first class after said variable having been associated with said second class, storing an attribute of said first class using said memory allocated to said variable, wherein said attribute of said first class is had in common by said second class; and
- in response to said variable being associated with said first class after said variable having been associated with said second class, freeing memory that stores said second attribute.

44. A tangible computer-readable medium carrying one or more sequences of instructions for allocating computer memory to an instance of a first aggregate data type, wherein execution of the one or more sequences of instructions by one or more processors causes the one or more processors to perform the steps of:
- receiving an instruction to construct said instance;
- searching for a segment of memory that was most recently, but is not currently, allocated to an instance of a second aggregate data type;
- wherein the first aggregate data type includes a first attribute in common with the second aggregate data type; and
- storing, in said segment, data for said first attribute of said instance of said first aggregate data type.

* * * * *